US007998269B2

(12) United States Patent
Spangle et al.

(10) Patent No.: US 7,998,269 B2
(45) Date of Patent: Aug. 16, 2011

(54) CEMENT BLEND

(75) Inventors: Lloyd Byron Spangle, Claremore, OK (US); Landreth L. Moran, Chico, TX (US)

(73) Assignee: Catalyst Partners, Inc., Chico, TX (US)

( * ) Notice: Subject to any disclaimer, the term of this patent is extended or adjusted under 35 U.S.C. 154(b) by 98 days.

(21) Appl. No.: 12/095,263

(22) PCT Filed: Jun. 1, 2007

(86) PCT No.: PCT/US2007/070263
§ 371 (c)(1),
(2), (4) Date: May 28, 2008

(87) PCT Pub. No.: WO2007/143581
PCT Pub. Date: Dec. 13, 2007

(65) Prior Publication Data
US 2009/0283017 A1   Nov. 19, 2009

Related U.S. Application Data

(60) Provisional application No. 60/803,820, filed on Jun. 2, 2006.

(51) Int. Cl.
*C04B 14/04* (2006.01)
(52) U.S. Cl. ........................... 106/737; 166/292
(58) Field of Classification Search ................. 106/737; 166/292
See application file for complete search history.

(56) References Cited

U.S. PATENT DOCUMENTS

| | | | |
|---|---|---|---|
| 5,873,936 A | 2/1999 | Ogden | |
| 6,739,806 B1 | 5/2004 | Szymanski et al. | |
| 6,756,426 B2 | 6/2004 | Brother et al. | |
| 6,902,614 B2 | 6/2005 | Ratomski et al. | |
| 6,969,424 B2 * | 11/2005 | Hermansson et al. | 106/692 |
| 2003/0000423 A1 | 1/2003 | Vijn et al. | |
| 2003/0150615 A1 | 8/2003 | Dao et al. | |
| 2004/0112598 A1 | 6/2004 | Nguyen et al. | |

FOREIGN PATENT DOCUMENTS

| | | |
|---|---|---|
| GB | 2246772 | 12/1992 |
| RU | 2235857 | 9/2004 |
| WO | WO 90/14319 | 11/1990 |
| WO | WO 98/54108 | 12/1998 |

OTHER PUBLICATIONS

An advertising sheet by Silbrico Corporation showing sil-cell which is a refined mineral processed by Silbrico Corp.
Information sheet regarding "sil-cell," which is a refined mineral that is processed by Silbrico Corporation; see website: http://www.silbrico.com/.
International Search Report in PCT/US2007/070263 dated Nov. 27, 2007.
Written Opinion in PCT/US2007/070263 dated Nov. 27, 2007.
Canadian Office Action mailed May 13, 2010, in Application No. 2,635,925.

* cited by examiner

*Primary Examiner* — Paul Marcantoni
(74) *Attorney, Agent, or Firm* — Charles D. Gunter, Jr.

(57) ABSTRACT

A cement includes a cement mixture and a permeable, microcluster silica material present in an amount from about 10 percent to about 30 percent by weight of the cement mixture. The cement blend may be used in casing a borehole when appropriate fluid loss agents are included in the cement blend. Additionally, a cement additive is added to a cement mixture to provide the cement blend. This cement additive can be formulated in a kit form.

23 Claims, No Drawings

CEMENT BLEND

PRIORITY CLAIM

This application claims the benefit of U.S. Provisional application No. 60/803,820 filed Jun. 2, 2006 and is incorporated by reference herein in its entirety.

FIELD OF INVENTION

The present invention relates generally to compositions for cement blends, including compositions that may be useful in casing a borehole.

BACKGROUND OF THE INVENTION

Cements are materials which set and harden after combining with water, as a result of chemical reactions with the mixing water and, after hardening, retain strength and stability even upon exposure to water. Most construction cements today are hydraulic cements, and most of these are based upon Portland cement, which is made primarily from limestone, certain clay minerals, and gypsum, in a high temperature process that drives off carbon dioxide and chemically combines the primary ingredients into new compounds.

Setting and hardening of hydraulic cements is caused by the formation of water-containing compounds, forming as a result of reactions between cement components and water. The reaction and the reaction products are referred to as hydration and hydrates or hydrate phases, respectively. As a result of the immediately starting reactions, a stiffening can be observed which is very small in the beginning, but which increases with time. After reaching a certain level, this point in time is referred to as the start of setting. The consecutive further consolidation is called setting, after which the phase of hardening begins. The compressive strength of the material then grows steadily, over a period which ranges from a few days in the case of "ultra-rapid-hardening" cements, to several years in the case of ordinary cements.

The compressive strength of a cement is an important characteristic, especially in applications that place the cement under stressful conditions, such as those that exist when the cement is used as a casing in a wellbore in a subterranean formation. Cements are generally dense compositions, but in some applications it may be desirable to have the compressive strength of a typical cement coupled with a light weight. Currently there is a paucity of such compositions available that have both these traits. Thus, there is a continuing need for the development of cement blend compositions.

SUMMARY OF THE INVENTION

The present invention provides a cement blend that includes a cement mixture and a permeable, micro-cluster silica material present in an amount from about 10 percent to about 30 percent by weight of the cement mixture.

In other aspects, the present invention includes using the cement blend in casing a borehole when appropriate fluid loss agents are included in the cement blend.

Additionally, the present invention provides a cement additive that is added to a cement mixture to provide the cement blend. This additive may also be formulated in a kit form.

The present invention provides cement blends with relatively low specific gravity (9.5 to 11.5 lb per gallon) which results in desirable, improved, compressive strength using economical formulations that are easily prepared and applied.

The foregoing has outlined rather broadly the features of the present invention in order that the detailed description of the invention that follows may be better understood. Additional features and advantages of the invention will be described hereinafter, which form the subject of the claims of the invention.

DETAILED DESCRIPTION

The present invention provides a cement blend that is made up of a cement mixture and a permeable, micro-cluster silica material present in an amount from about 10 percent to about 30 percent by weight of the cement mixture. More specifically, the composition of the cement blend generally includes Portland Cement with 10 to 30 percent of a Perlite mineral refined to produce hollow glass particles which are primarily less than 75 microns in diameter. The glass particles are microscopic clusters of glass bubbles with interconnecting openings providing "permeability." The bubbles within the cluster may be referred to as "cells" or "micro-cells."

The Cement Mixture

The initial cement mixture may be any commonly used cement. Portland cement is the most common type of cement in general usage and is the basic ingredient of concrete, mortar, stucco and most non-specialty grout. It is a fine powder produced by grinding Portland cement clinker (more than 90%), up to about 5% gypsum which controls the set time, and up to about 5% minor constituents (as allowed by various standards). There are five types of Portland cements with variations of the first three according to ASTM C150. The cement mixture of the present invention may include Type III Portland cement which is very close in composition to Type I Portland cement and is generally of a finer grade than Type I Portland cement.

Type I Portland cement is known as common or general purpose cement. It is commonly used for general construction especially when making precast and precast-prestressed concrete that is not to be in contact with soils or ground water. The typical compound compositions of this type are 55% ($C_3S$), 19% ($C_2S$), 10% ($C_3A$), 7% ($C_4AF$), 2.8% MgO, 2.9% ($SO_3$), 1.0% Ignition loss, and 1.0% free CaO.

Type III has a relatively high early strength. Its typical composition is 57% ($C_3S$), 19% ($C_2S$), 10% ($C_3A$), 7% ($C_4AF$), 3.0% MgO, 3.1% ($SO_3$), 0.9% Ignition loss, and 1.3% free CaO. The gypsum level may also be increased a small amount. This gives the concrete using this type of cement a three day compressive strength equal to the seven day compressive strength of types I and II. Finally, other cement types useful in the cement blend of the present invention include (high-early set) HE and class C cements.

Permeable, Micro-Cluster Silica Material

The Perlite-derived material used in the present invention are microcellular fillers that are inert, inorganic, hollow glass particles with irregular spherical geometries. These particles are commercially available and sold under the name sil-cell® by Silbrico Corporation (Hodgkins, Ill.). Sil-cell® particles have a greater tensile strength than the usual spherical bubbles. Sil-cell® has a low effective specific gravity (E.S.G.=0.18) and makes cost effective the manufacture of adhesives, auto body putty, cultured marble, coatings, wall patching compounds and stucco in which Sil-cell® is incorporated. The approximate composition of Sil-cell® is 73% silicon dioxide, 17% aluminum oxide, 5% potassium oxide 3% sodium oxide, 1% calcium oxide and trace elements.

The use of a low shear, folding type mixture is desirable to minimize particle breakage when using Sil-cell®. Thus, low shear testing procedures were used to mix compositions with Sil-cell®. Tests where high shear was used resulted in break-up of the structures and release of the entrapped gas. If the micro-clusters are completely broken-up, they no longer occupy the space in the liquid slurry needed to eventually intake the excess water used to initially mix and pump the slurry. The resulting slurry would be weakened when it hardens into set cement. Silbrico Corporation product Sil-43BC used in these preferred composition tests has an average particle size of about 35 microns with a range of 1 to 150 microns, and at least 95 percent less than 75 microns. Generally, a grade of micro-cluster silica material has an average particle size ranging from about 30 to about 80 microns and a range of distribution from about 1 micron to about 200 microns. More desirably, the permeable, micro-cluster silica material has an average particle size ranging from about 30 to about 50 microns and a range of distribution from about 1 micron to about 200 microns and even better an average particle size ranging from about 30 to about 40 microns and a range of distribution from about 1 micron to about 150 microns.

The micro-clusters of glass bubbles in Sil-cell® have high permeability. The high permeability allows the micro-clusters to exchange void air space (when hydraulic pressure is applied) with water from the cement matrix that surrounds the micro-cluster. On the other hand, when structures that are not permeable (which is the case with micro-spheres and micro-beads), the micro-clusters would be subject to collapse under pressure. The use of crushable structures under high hydraulic pressure results in dramatic rheology change when collapse takes place. This can render such a slurry unpumpable or at a severe density change due to the collapse of the air space.

The use of the permeable non-crushing, micro-clusters of glass bubbles avoids this possibility. The Ideal Gas Law can be used to calculate the density change with pressure. The increase in pressure is directly related to the decrease in volume of gas. Also, simulated pressure conditions can be used in unique testing methods to predict the rheology profile and hydration characteristics of the cement mixture. Testing has verified the integrity of the micro-clusters of glass bubbles after water has invaded the permeable structures under high hydraulic pressure. Thus, the micro-cluster retains its dimensions while filling with water from the surrounding fluid.

Other Ingredients in the Cement Blend

Depending on the application the cement blend may contain further ingredients, for example, retarders, accelerators, and fluid loss agents. Preferable composition may include chloride accelerators in an amount from about 1 percent to about 10 percent by weight of the cement mixture. Examples of such chloride accelerators include, but are not limited to, sodium chloride and calcium chloride. In applications such as wellbore casing, fluid loss agents may be added in the cement blend. In such formulations the cement blend may include about 0.5 percent to about 3 percent polyvinyl alcohol fluid-loss agent, for example. It has also been observed that it is beneficial for polyvinyl alcohol derived fluid-loss agents to be partially hydrolyzed, generally from about 86 percent to about 89 percent. Finally, the cement blend may also include defoaming agents to prevent excessive foaming on mixing the cement slurry.

The cement blend may contain water in amount from about 150 to about 250 percent by weight of the cement mixture. When the cement blend is mixed with additional water for generating a slurry and pumping, the water may be fresh water or brine water. This is beneficial because it allows use of the water on site during a wellbore casing operation, for example, where the water from the wellbore itself may be usable in generating the cement slurry.

The cement blend of the present invention uses the microscopic clusters of Sil-cell® to take in water under hydraulic pressure without collapsing or changing physical size and shape. If the "cluster" collapsed, the excess water would dilute the hardening cement matrix resulting in weak, sedimenting cement. However, excess water is also needed (initially) to mix and pump the slurry. Furthermore, excess water protects to some degree the physical structure of the shear-sensitive "clusters." Since the microscopic clusters do not collapse, they are available to physically separate the excess water from the hardening cement matrix which results in a much stronger cement matrix.

The permeable, glass particles (micro-clusters) together with hydration accelerators and fluid-loss reducing agents act as a gas/liquid exchange mechanism that absorbs excess water under pressure without displacing compressed gas from its original location. The result of such a mechanism allows the excess water to be used advantageously for mixing and transferring the liquid slurry, such as pumping into a subsurface well or grouting operation.

Tests have shown that if the cement has a decrease in hydraulic pressure before the stiffness (or gel-strength) of the cement has developed, then the expanding gas leaves and water remains in the micro-cluster cell. This can occur when the cement slurry is subjected to hydraulic pressure of several hundred psi, then, while the slurry is still unhydrated and in a fluid condition, the hydraulic pressure is removed. The result can be gas bubbles being released from the slurry and migrating to the surface. However, as long as the slurry is under hydraulic pressure, there are no gas bubbles released.

Also, as in a practical application of annular fill in an oil or gas well it has been observed from tests that the air remains compressed in the micro-cell structure due to hydrostatic head pressure. As the cement hardens and hydrostatic pressure is relieved, the gas remains locked in the solidified structure. At this point, there would be some internal gas pressure against the surrounding cement matrix that should enhance bonding to formation and pipe.

Moreover, the fluid-loss agent works in conjunction with the micro-cluster permeability to create a "restricting-valve effect" at the surface of the micro-cluster cell. Water is able to penetrate under high pressure without crushing the cell but does not leave after invading the cell. The gas originally in the cell compresses and remains also, unless all hydraulic pressure is removed while the cement matrix is in a liquid (slurry) state. It is at this time that the gas would exit and water remains in the cell. This has been observed by pressure and rheology testing.

The present invention also provides a cement additive which includes a permeable, micro-cluster silica material, a chloride accelerator in about 17% by weight of said micro-cluster silica material, a fluid loss agent in about 12% by weight of said micro-cluster silica material; and a defoamer in about 1% by weight of said micro-cluster silica material. The cement additive may also contain about 75 to 150% by weight of a cement mixture such as Portland cement. Such formulations may be conveniently available in kit form to add to a Portland cement or any cement mixture to generate a cement blend that will have a low density but high compressive strength. Optionally, a user may generate the cement additive from the individual components since applications may vary. Indeed it may be of little consequence to a user whether or not a fluid loss agent is added to the final cement blend.

As alluded to above, the cement blend can be used for subsurface cementing operations. The cement blend which has fluid loss agents and chloride accelerators may be ideal for such applications. The cement blend is generally formed into a slurry with water, which can then be delivered to the well-bore for the cement application needed, such as annular fill between the casing and the formation. Thus, a permanent cement to secure the pipe in the well-bore and isolate zones of formation fluids made by adding water to the cement blend of the subject invention to form a cement slurry and delivering the cement slurry to the well-bore.

A sub-surface cementing composition made with the cement blend of the subject invention will have a high compressive strength, and yet be relatively light weight. This may be advantageous since excessive hydrostatic pressure from high density fluids can result in formation fracturing and loss of the cement slurry into the fractured zone instead of filling of the annular space and a successful cementing job. If such light weight slurries are not available then multiple stages of cement injection is required to prevent "loss of circulation" as the fracturing problem is called. These multiple stage operations are much more costly than a continuous cementing job and require specialized hardware to open ports for the correct placement of the cement. The composition of the present invention increases the "yield" of the resulting cement mixture due to the inclusion of very high water content. This means the volume of fill available is greatly increased by the water content which is usually the cheapest component of a cement slurry.

Example

The following examples are included to demonstrate particular embodiments of the present invention. It should be appreciated by those of skill in the art that the compositions disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example Composition

Portland cement—300 parts by weight
Cellular silica (Silbrico grade Sil-43BC)—45 parts by weight
Sodium chloride—9 parts by weight
Flobloc 210 (polyvinyl alcohol fluid loss agent)—6 parts by weight
Defoamer—0.5 parts by weight
Water—525 parts by weight
Compressive Strength of Composition
Cured 48 hours at 80є F and 1000 psi in accordance with API standard testing procedures.
Test one—708 lbs per sq. inch
Test two—723 lbs per sq inch
Test three—769 lbs per sq inch
Test four—769 lbs per sq inch
Thickening Time of Composition
The apparatus used in this test, which requires high pressure be applied to the stirred slurry, had to be modified from the standard slurry container to allow compression of the entrapped gas without collapsing the internal diaphragm of the container. Without such modifications the hydraulic fluid used to maintain test pressure, would invariably invade the slurry container and mix oil with the cement slurry and also collapse the separating diaphragm onto the stirring paddle.

Using API casing-cementing schedule 1 g (80є F and 1000 psi)
Test one—300 minutes to 50 $B_c$
Test two—472 minutes to 70 $B_c$ (555 parts water used in this test)
Fluid Loss of Composition
API testing procedure for high pressure fluid loss at 80є F and 1000 psi
Test one—33 milliliters (555 parts water used in this test)
Test two—35 milliliters (555 parts water used in this test)
Free Water of Composition Slurry
API testing procedure for free water—0 milliliters The present invention provides cement mixtures with relatively low specific gravity (9.5 to 11.5 lb per gallon) which result in desirable, improved, compressive strength using economical formulations that are easily prepared and applied. While specific embodiments of the invention have been shown and described in detail to illustrate the application of the principles of the invention, it will be understood that the invention may be embodied otherwise without departing from such principles.

What is claimed is:

1. A cement blend comprising:
    a hydraulic cement mixture;
    a permeable, micro-cluster silica material comprising approximately 73 percent silicon dioxide, approximately 17 percent aluminum oxide, approximately 5 percent potassium oxide, approximately 3 percent sodium oxide, and approximately 1 percent calcium oxide and a void air space containing a gas, wherein said material is present in an amount from about 10 percent to about 30 percent by weight of said cement mixture;
    wherein said material does not compress when said material is hydraulically pressurized by a fluid and wherein said material absorbs at least a portion of said fluid without displacing said gas from said void air space.

2. The cement blend of claim 1, wherein at least about 75% of said material comprises particles with a particle size of about 30 to about 80 microns.

3. The cement blend of claim 1, further comprising an accelerator.

4. The cement blend of claim 1, further comprising a fluid loss agent.

5. The cement blend of claim 1, wherein said material releases said gas within said material as said pressure is reduced.

6. The cement blend of claim 1, wherein the cement is selected from the group consisting of Type III Portland cement, high early set cement, and class C cement.

7. The cement blend of claim 1, wherein said material has an average particle size ranging from about 30 to about 80 microns and a range of distribution from about 1 micron to 200 microns.

8. The cement blend of claim 1, wherein said cement blend further comprises water in amount from about 150 to about 250 percent by weight of the cement mixture.

9. The cement blend of claim 5, wherein said water is selected from the group consisting of fresh water or brine water.

10. The cement blend of claim 1, further comprising a defoamer.

11. A cement additive comprising:
    a permeable, micro-cluster silica material comprising approximately 73 percent silicon dioxide, approximately 17 percent aluminum oxide, approximately 5 percent potassium oxide, approximately 3 percent sodium oxide, and approximately 1 percent calcium oxide and a void air space containing a gas, wherein said material does not compress when said material is hydraulically pressurized by a fluid and wherein said material absorbs at least a portion of said fluid without displacing said gas from said void air space;

a chloride accelerator in about 15 to 20 percent by weight of said micro-cluster silica material;

a fluid loss agent in about 10 to 15 percent by weight of said micro-cluster silica material; and a defoamer in about 0.01 to 1 percent by weight of said micro-cluster silica material.

12. The cement additive of claim 1, further comprising a hydraulic cement mixture present in an amount from about 10 percent to about 15 percent by weight of said cement additive.

13. A kit comprising:

a permeable, micro-cluster silica material comprising approximately 73 percent silicon dioxide, approximately 17 percent aluminum oxide, approximately 5 percent potassium oxide, approximately 3 percent sodium oxide, and approximately 1 percent calcium oxide and a void air space containing a gas, wherein said material does not compress when said material is hydraulically pressurized by a fluid and wherein said material absorbs at least a portion of said fluid without displacing said gas from said void air space; and a fluid loss agent in about 10 to 15 percent by weight of said micro-cluster silica material.

14. A process of making a cement blend comprising adding said cement additive of claim 11 to a hydraulic cement mixture.

15. A process of making a cement blend comprising adding the contents of said kit of claim 13 to a hydraulic cement mixture.

16. A cemented wellbore made by the process of:

adding water to the said hydraulic cement blend of claim 1 to form a cement slurry; and delivering said cement slurry to said wellbore.

17. A cemented wellbore comprising said cement blend of claim 1.

18. A process of cementing a wellbore comprising delivering to said wellbore the cement blend of claim 1.

19. A cement blend comprising:

a hydraulic cement mixture;

a permeable, micro-cluster silica material comprising approximately 73 percent silicon dioxide, approximately 17 percent aluminum oxide, approximately 5 percent potassium oxide, approximately 3 percent sodium oxide, and approximately 1 percent calcium oxide and;

a fluid loss agent; and a defoamer.

20. The cement blend of claim 19, wherein said blend further comprises a chloride accelerator.

21. A process of cementing a wellbore, said process comprising the steps of:

mixing cement blend comprising a hydraulic cement mixture; a permeable, micro-cluster silica material comprising approximately 73 percent silicon dioxide, approximately 17 percent aluminum oxide, approximately 5 percent potassium oxide, approximately 3 percent sodium oxide, and approximately 1 percent calcium oxide and a void air space containing a gas, wherein said material does not compress when said material is hydraulically pressurized by a fluid and wherein said material absorbs at least a portion of said fluid without displacing said gas from said void air space; said material present in an amount from about 10 percent to about 30 percent by weight of said cement mixture; an accelerator; and, a fluid loss agent to create a gas/liquid exchange mechanism;

pressurizing said cement blend whereby said material absorbs excess fluid into said material without displacing said gas; and, delivering said cement blend to a wellbore.

22. The process of claim 21, further comprising the step of reducing said pressure whereby said gas within said material is released.

23. The process of claim 21, further comprising the step of mixing a defoamer into said cement blend.

* * * * *